(12) United States Patent
Ayhan et al.

(10) Patent No.: US 12,707,261 B2
(45) Date of Patent: Aug. 11, 2026

(54) METHOD AND SYSTEM FOR AUTHENTICATION OF RF DEVICE

(71) Applicant: NAGRAVISION SÀRL, Cheseaux-sur-Lausanne (CH)

(72) Inventors: Sinan Ayhan, Cheseaux-sur-Lausanne (CH); Joël Conus, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 132 days.

(21) Appl. No.: 18/693,817

(22) PCT Filed: Sep. 16, 2022

(86) PCT No.: PCT/EP2022/075739
§ 371 (c)(1),
(2) Date: Mar. 20, 2024

(87) PCT Pub. No.: WO2023/046581
PCT Pub. Date: Mar. 30, 2023

(65) Prior Publication Data

US 2024/0397314 A1 Nov. 28, 2024

(30) Foreign Application Priority Data

Sep. 21, 2021 (EP) .................................... 21197936

(51) Int. Cl.
*H04L 29/06* (2006.01)
*H04W 12/06* (2021.01)

(52) U.S. Cl.
CPC .................................. *H04W 12/06* (2013.01)

(58) Field of Classification Search
CPC ....... H04L 63/20; H04L 63/10; H04L 63/304; H04L 63/0869; H04L 63/0263; H04W 12/06
See application file for complete search history.

(56) References Cited

PUBLICATIONS

Riyaz et al. (NPL—"Deep Learning Convolutional Neural Networks for Radio Identification", IEEE Communications Magazine., vol. 56, No. 9, Sep. 1, 2018 (Sep. 1, 2018) (Year: 2018).*
International Search Report & Written Opinion issued Dec. 15, 2022 in PCT/EP2022/075739, filed on Sep. 16, 2022, 15 pages.
European Search Report & Written Opinion issued Feb. 25, 2022 in EP application 21197936.4, filed on Sep. 21, 2021, 8 pages.

(Continued)

*Primary Examiner* — Longbit Chai
(74) *Attorney, Agent, or Firm* — POLSINELLI LLP

(57) ABSTRACT

The method for authenticating a first device, the method including receiving RF signals from the first device, acquiring feature data from the received RF signals, fitting a model for authenticating the first device using the acquired feature data, storing in memory the fitted model in a second device, and, by the second device receiving a new RF signal from a device to authenticate, acquiring feature data from the new RF signal, and determining whether or not the device to authenticate is the first device by transmitting the feature data, acquired from the new RF signal, as input to the fitted model, the feature data acquired from a RF signal includes values of only one of an in-phase component and a quadrature component of the RF signal over time.

20 Claims, 4 Drawing Sheets

(56) References Cited

PUBLICATIONS

Riyaz Shamnaz et al: "Deep Learning Convolutional Neural Networks for Radio Identification", IEEE Communications Magazine., vol. 56, No. 9, Sep. 1, 2018 (Sep. 1, 2018), XP055895402, pp. 146-152.

Roy Debashri et al: "RFAL: Adversarial Learning for RF Transmitter Identification and Classification", IEEE Transactions on Cognitive Communications and Networking, IEEE, USA, vol. 6, No. 2, Oct. 22, 2019 (Oct. 22, 2019), XP011792487, pp. 783-801.

Yongxin Liu et al: "Machine Learning for the Detection and Identification of Internet of Things (IoT) Devices: A Survey", arxiv.org, Cornell University Library, 201 Olin Library Cornell University Ithaca, NY 14853, Jan. 25, 2021 (Jan. 25, 2021), XP081866852, pp. 1-15.

* cited by examiner 209
207
208
203
204
200
I and/or Q data
201
202
M
206
205
20

30
T
Initialization
S00
TRANSMIT SG(t)
RECEIVE SG(t)
S11
S10
CONVERT to I and/or Q data and STORE
S12
S13

Abnormal I and/or Q data?
Yes
No
S14
S15
NORMALIZE I and/or Q data
Request new SG(t) to T
S16
TRANSMIT I and/or Q data to model M1
M1 output
S17
True or False?
FALSE
TRUE
S19
S18
ALLOW T
DO NOT ALLOW T

METHOD AND SYSTEM FOR AUTHENTICATION OF RF DEVICE

CROSS-REFERENCE TO RELATED APPLICATION(S)

The present application is a national stage application of Application No. PCT/EP2022/075739, filed Sep. 16, 2022, which claims priority to European Patent Application Ser. No. 21/197,936.4, filed Sep. 21, 2021. The benefit of priority is claimed to each of the foregoing, and the entire contents of each of the foregoing are incorporated herein by reference.

TECHNICAL FIELD

The present disclosure relates to authentication of a first RF (Radio Frequency) transmitter device by a second RF device.

BACKGROUND

Today, many devices can communicate using the radio spectrum, from cell phones to IoT sensors/devices. Generally, the devices carry an ID (in other words: an identifier) and implement some security measures such as encryption, identification and/or authentication to ensure confidentiality and/or authenticity of the RF communications. In the area of IoT, the devices are often low cost and based on hardware with a low level of security. Generally, they have an ID but the hardware security is not robust.

A main threat in RF communication systems is that a device could be cloned by acquiring all its memory, copying it on a false device that looks like the genuine device at a hardware level. Then, the cloned device can send message(s) as the genuine device. It is difficult then to differentiate the two devices (genuine and cloned).

Authentication is a key act to build a communication system of trusted devices.

To communicate by radio, a RF device has a chain of analog components, such as an oscillator, inductor, capacitor, . . . . The analog components are not perfect, and these imperfections have an impact on the form of the electromagnetic spectrum sent by the RF device via radio waves. For instance, the carrier frequency can have an offset due to a non-perfect oscillator. Such imperfection (Carrier Frequency Offset or "CFO") has no effect on the operation of the RF device, but it can be observed in its transmission spectrum. It creates a fingerprint of the RF device within the RF transmissions of the RF device. Since the hardware imperfections are almost impossible to clone, resulting fingerprints can be used to identify and/or authenticate the RF transmitter device. It is known to use such a fingerprint to identify and/or authenticate the RF transmitter device.

For example, U.S. Pat. No. 10,693,576 B2 discloses a method of fingerprinting authentication to authenticate a RF device based on CFO (Carrier Frequency Offset), used as a RF fingerprint of the RF device, and operational and/or ambient conditions such as temperature, relative humidity, etc., More precisely, CFO values of the RF transmissions originating from the RF device are calculated and used as a RF fingerprint of the RF device. Indeed, small imperfections in the analog components of the RF device induce small variations in its RF transmissions. The method disclosed in U.S. Pat. No. 10,693,576 B2 includes the following steps:

- receiving, by a RF receiver, a plurality of training RF transmissions from the RF device, wherein each of said training RF transmissions is temporally associated with operational parameters and ambient parameters of said RF receiver and said RF device;
- at a training stage, training a machine learning classifier based, at least in part, on a training set comprising:
  - (i) a Carrier Frequency Offset (CFO) value calculated for each of said training RF transmissions, and
  - (ii) labels associated with said operational parameters and said ambient parameters; and
- at an inference stage, applying said machine learning classifier to determine whether one or more runtime RF transmissions originate from said RF device.

However, the above method has some drawbacks. Indeed, the fingerprinting authentication disclosed in U.S. Pat. No. 10,693,576 B2 requires computational means to calculate the CFO values from the RF transmissions. Furthermore, it is necessary to determine the ambient and/or operational conditions, which requires some sensors in the RF device, to more accurately authenticate the RF transmitter device.

Therefore, there is a need for facilitating the authentication based on the RF transmissions of a RF device.

SUMMARY

The present disclosure concerns a computer-implemented method for authentication of a first device, comprising the following steps:

- A) receiving a plurality of RF signals from the first device;
- B) acquiring feature data from the received RF signals;
- C) fitting a model for authenticating said first device using the acquired feature data;
- D) storing in memory the fitted model in a second device;
- E) by the second device, receiving a new RF signal from a device to authenticate;
- F) by the second device, acquiring feature data from the new RF signal; and
- G) by the second device, determining whether or not the device to authenticate is the first device by transmitting the feature data, acquired from the new RF signal, as input to the fitted model;
- wherein the feature data acquired from a RF signal includes values of only one of an in-phase component I(t) of said RF signal over time and a quadrature component Q(t) of the RF signal over time.

The feature data of the received RF signals, that is used to fit the model, includes I data or Q data. Once it has been fitted (e.g., trained) using the I or Q data, the model is stored in the second RF device. The second RF device is paired with the first RF device. The two paired RF devices are expected to communicate with each other. For instance, the first RF device is an IoT device or sensor and the second device is an IoT gateway. When the first RF device wants to connect to and/or communicate with the second RF device, the latter performs the steps E) to G) above defined in order to allow (or not to allow) the first RF device access to the second RF device and/or further online services.

The above defined method for authenticating the first RF device based on RF signals transmitted by said first RF device facilitates the authentication, improves its performance and reduces the computational efforts. The authentication is based on the I data and/or Q data obtained from the RF signal received from the first RF device, which facilitates the implementation of the method. The I data or Q data is used as a fingerprint of the first RF device. The authentication is very accurate. There is no need to use the ambient and/or operational conditions to authenticate in a reliable and efficient manner. The present method allows to have a good authentication scheme, while reducing production cost and computational efforts.

Furthermore, training or fitting the model using only I data, or Q data, allows to significantly reduce the time required for the training. Then, the in step of determining, by the second device, whether or not the device to authenticate is the first device using the fitted or trained model, there is no significant difference in the accuracy of the authentication between using only the I data, or Q data, and both I and Q data. It allows to reduce the amount of data processed by the model.

The model can be a machine learning model, and the step of fitting the model can include a step of training the machine learning model using the feature data as input training data.

In an embodiment, the machine learning model is trained in a semi-supervised manner by using input training data that exclusively includes feature data acquired from RF signals transmitted from the first device.

In an embodiment, the model is an anomaly detection model. In data analysis, anomaly detection (also termed as outlier detection) is the identification of rare items, events or observations which raise suspicions by differing significantly from most of the data. In the context of authentication and clone detection, the anomaly detection is very well adapted to the problem. It allows to flag a new incoming RF signal, converted into feature data, as an anomaly or a normal RF signal. In other words, the anomaly detection allows to detect if a new incoming RF signal is a normal RF signal, sent from the genuine RF device, or an anomaly (sent by a cloned RF device).

After storing of the fitted model in memory, the model can be updated by the second device based on feature data acquired from a new RF signal received from the first device. Thus, after storage in memory in the second RF device, the fitted model can be updated with new feature data from RF signal(s) newly received from the first RF device. This allows to adapt the model to various environmental conditions that may not be included in the initial model stored in memory in the second RF device.

Optionally, the method further comprises a step of normalizing the feature data (in other words: the I data or the Q data) before providing the normalized feature data to the model in at least one of the steps C) and G). The main advantage of the data normalization is to make the data less dependent on the signal's strength received by the second RF device. Indeed, the strength of the received signal has an impact on the absolute values of the feature data: the smaller the received signal strength, the closer the received feature values are to 0. By forcing all values to be in the same scale through normalization, the model becomes less sensitive to the received signal strength.

Optionally, the method further comprises a step of filtering the feature data before providing the filtered feature data to the model in at least one of the steps C) and G).

Some received RF signals may require to be processed or removed. For example, the duration of a RF signal can be abnormally very short compared to the average duration of the RF signals. The actions of removing or processing RF signals allows to improve the efficiency and accuracy of the method. Optionally, decimation can be performed. It basically consists in removing samples (and usually also applying a low-pass filter). The goal is to have less samples to process.

The set of steps A) to C) can performed by the second device or, alternatively, by a third device, different from the second device.

In an embodiment, the steps A) to C) are also performed for a plurality of RF signals transmitted by the second device to fit a model for authenticating said second device, and the steps D) to G) are also performed by the first device for authentication of the second device using said fitted model, so that the first and second devices perform a mutual authentication.

In an embodiment, the steps A) to C) are performed for a plurality of first devices and a plurality of fitted models, corresponding to the plurality of first devices respectively, are stored in memory in the second device.

The method can further comprise

- a step of establishing a communication between the device to authenticate and the second device, wherein the device to authenticate transmits an identifier to the second device; and
- a step of selecting, by the second device the fitted model corresponding to the device to authenticate among the plurality of fitted models stored in memory based on the identifier of said device to authenticate, the selected fitted model being used in the step G).

The present disclosure also concerns a system for authentication of a first device, comprising

- either a second device configured to perform the steps A) to G) of the method previously defined,
- or a second device configured to perform the steps D) to G) of the method previously defined and a third device configured to perform the steps A) to C) of the method previously defined.

The present disclosure also concerns a computer program comprising instructions which, when the program is executed by a computer, cause the computer to perform the steps of the computer-implemented method previously defined.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
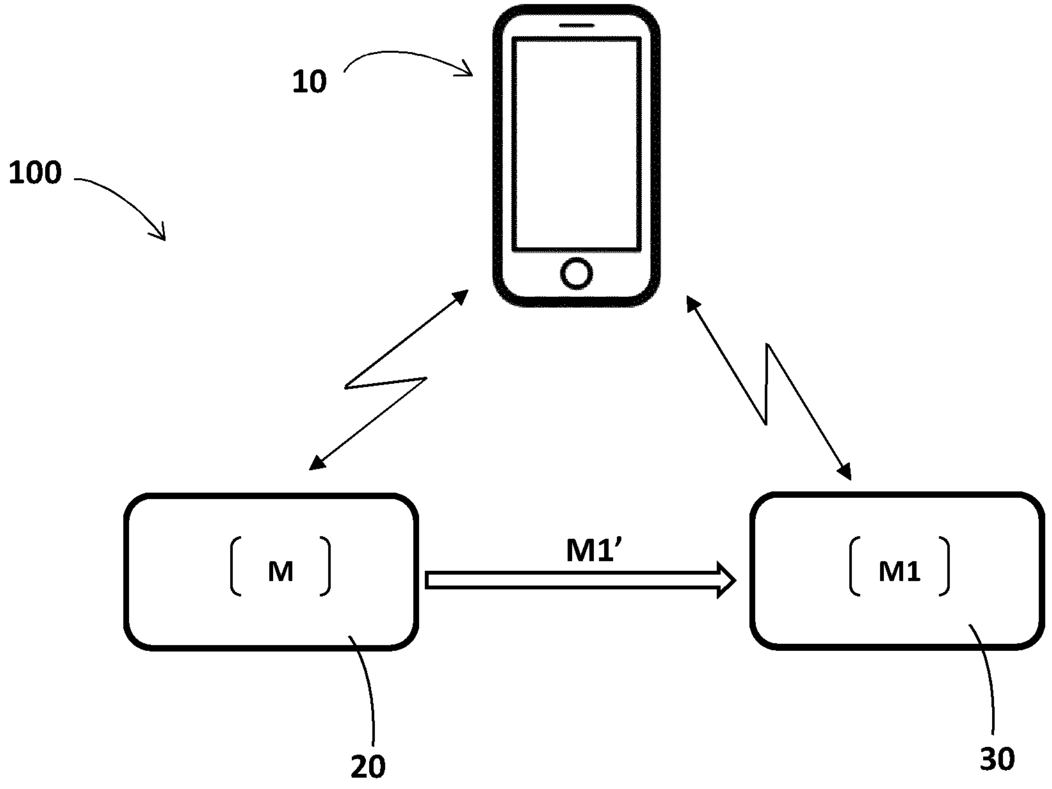
FIG. 1 is a block diagram of a system for authentication of a first RF device based on RF signals originating from said first RF device, according to an embodiment.

The computer-implemented method of the present disclosure may be used to identify and/or authenticate a wireless, or RF (Radio Frequency), first device 10. The authentication of the first RF device 10 is based on RF signals transmitted by said first RF device 10, more precisely on feature data of the RF signals from the first RF device 10.

The computer-implemented method includes an initial phase (process) for fitting (or training) a model for authentication of the first device 10 and an operational phase wherein the fitted model is used by a second RF device 30 to authenticate the first device 10. The initial phase can be performed by the second RF device 30 or, alternatively, by a third RF device 20, different from the second RF device 30.

The first RF device 10 can be a RF transmitter device or a RF transceiver device. The second RF device 30 can be a receiver device or a transceiver device. The third RF device 20 can be a receiver device or a transceiver device. The first RF device 10 and the second RF device 30 are paired or to be paired with each other. As an illustrative and non-limitative example, the first RF device 10 is an IoT device or sensor and the second RF device 30 is an IoT gateway.

In the initial (in other words: training or learning) stage, the second RF device 30 (or, alternatively, the third RF device 20) receives a plurality of RF signals SGi(t), with i=1, 2, 3, . . . , or RF messages, transmitted from the first RF device 10. In an embodiment, the RF signals transmitted by the first RF device 10 are a repetition of a same message, with the same content and the same device and/or protocol specific parameters. In that case, the RF device 10 sends repeatedly the same message. It can be a message intended to be sent later by the RF device 10 in operational mode (in other words: during use of the RF device 10 in real environment). In another embodiment, different messages could be sent. In particular, if the RF device 10 is intended to send different messages during its life-time (in operational mode), these messages can be used to efficiently train the model. More precisely, feature data acquired from the received RF signals SGi(t) is then used to fit (in other words: to learn, or train) a model M responsible for performing (later) a task of authenticating the first RF device 10. The number of sent messages necessary to obtain a performant model for authentication may depend on the first device 10, the content of the message, and/or other parameters. For instance, several hundred messages could be sent to correctly fit the model M on the first RF device 10. Once it has been fitted on the feature data acquired from a plurality of RF signals originating from the RF device 10, the model M is saved and the second RF device 30 stores it in memory. Then, in an operational mode (in other words: at an inference stage), the second RF device 30 can authenticate the first (known) RF device 10 by transmitting (giving) as input to the model M stored in memory, one or more new RF signals transmitted from the first RF device 10 to the second RF device 30.

In an embodiment, the feature data acquired from any RF signal (or message) includes I data and Q data of the RF signal over time, in other words a series of values of the in-phase component I(t) and a series of values of a quadrature component Q(t), of the received RF signal SGi(t) over time. The I data and Q data are acquired from the received RF signal SGi(t) over time by a component of a radio receiver and/or by a quadrature demodulator (also termed as an I/Q demodulator), of the second device 30 or third device 20.

In other embodiments, the feature data acquired from a received RF signal (or message) and to be provided to the model M (in initial phase) or M1 (in operational mode) includes either only the I data (in other words only a series of values of the in-phase component I(t) of the received RF signal over time), or only the Q data (in other words only a series of values of the quadrature-phase component Q(t) of the received RF signal over time).

The feature data acquired from any RF signal originating from a RF device is used as a fingerprint of said RF device.

In an embodiment, the model is an Anomaly Detection model. The goal of Anomaly Detection (AD), also termed as "Outlier Detection", is to flag a new incoming point as an anomaly or a normal point. In the context of fingerprinting authentication, the goal is to detect if a new incoming message (in other words: a new received RF signal) is a normal message sent by a known transmitter device or an anomaly sent by another device, like a cloned device. So, an advantage of using specifically an Anomaly Detection model is for interpretability and good understanding of the strategy.

In an embodiment, the model M is a machine learning model. It is trained to authenticate the first RF device 10 using the feature data (in other words: the I data and Q data, or I data only, or Q data only) acquired from each of a plurality of RF signals received from the first RF device 10. Thus, the model M learns the specificities of the first RF device 10.

Alternatively, the model M could be a statistical model, a spectral model or an information-theoretic based model.

In an operational mode (in other words: at an inference stage), the second RF device 30 is responsible for authenticating the first RF device 10 using the stored model M1, previously fitted or trained.

When the second RF device 30 receives a new RF signal from a RF device to authenticate T, it acquires the feature data from the received RF signal (in other words: the I data and Q data, or alternatively only the I or Q data) and transmits (provides) the acquired feature data as input data to the model M1 stored in memory to determine whether or not the RF device to authenticate T is the first RF device 10.

In the initial (training) stage and in the operational (inference) stage, the feature data (I data and Q data, or only I or Q data) can optionally be pre-processed before being provided as inputs to the model. The pre-processing can include a normalization and/or a filtering by removing and/or processing data, as explained later in more detail.

FIG. 1 is a block diagram of a system 100 for authentication of the first RF device 10 based on RF signals originating from said first RF device 10, according to an embodiment.

The system 100 includes the second RF device 30 and optionally the third RF device 20. A role of the second RF device 30 (or, alternatively, of the third RF device 20) is to fit the model M to RF received signals transmitted by the first RF device 10. The second RF device 30 stores in memory the model M1 fitted to the first RF device 10. Then, the second RF device 30 can authenticate the first RF device 10 by means of the model M1 and using one or more RF signals transmitted from the first RF device 10 and provided as input to the model M1.

Figures 2, 3:
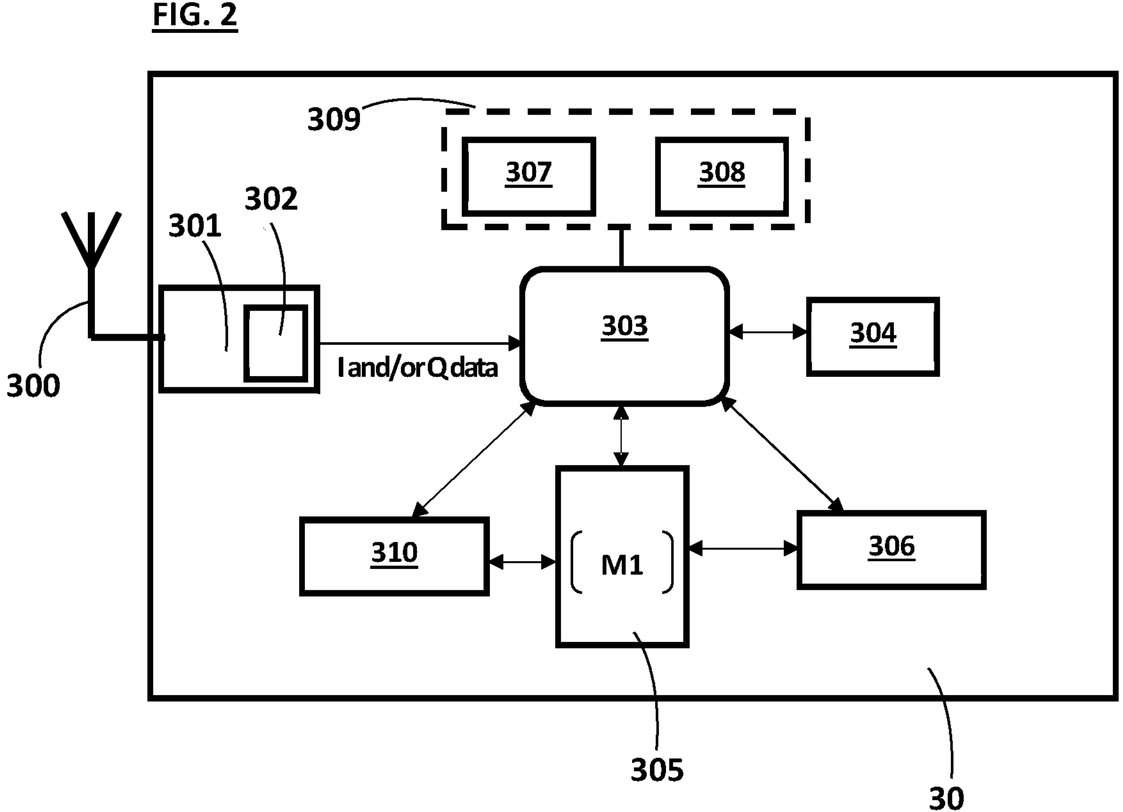
FIG. 2 is a block diagram of a second RF device of the system of FIG. 1, according to an embodiment.
FIG. 3 is a block diagram of a third RF device of the system of FIG. 1, according to an embodiment.

The second RF device 30 illustrated in FIG. 2 includes an antenna 300, a radio receiver 301 with an IQ-demodulator 302, a processor or CPU (Central Processing Unit) 303, a RAM 304, a storage unit 305, a fitting or training component 306 to train (fit) a model and optionally update the fitted model, and an authentication component 310.

As well known by the person skilled in the art, the radio receiver 301 receives radio waves through the antenna 300 and converts the information carried by the radio waves to a usable form. It includes different components (mixers, filters, amplifiers, modulators/demodulators, detectors, etc.) that can be implemented in hardware and/or software. In an embodiment, the radio receiver includes a software defined radio or SDR chip where components are implemented by software. Alternatively, the radio receiver could be implemented in hardware or by a mix of hardware and software.

Advantageously, the second RF device 30 introduces low jitter (bias) in the received RF signals. Indeed, the second RF device 30 is likely to introduce jitter or bias in the received RF signals since it is also dependent on analog components. This bias can be significantly reduced by using high quality components. This is particularly interesting in the embodiment of the system 100 including the second RF device 30 and the third RF device 20. As will be explained later, in such embodiment, the third RF device 20 is responsible for fitting (training) the model M to RF received signals transmitted by the first RF device 10 and the second RF device 30 then uses the fitted model. But, in the embodiment of the system 100 including a second RF device 30 that is responsible for both fitting (training) the model on the first RF device 10 and then using the trained model to authenticate the first RF device 10, the bias introduced by the second RF device 30 doesn't matter. In that case (when the same receiver is used for training and operations), it is not necessary to use high quality components.

In the present disclosure, the radio receiver 301 includes an IQ-demodulator 302 (also called a quadrature demodulator) responsible for converting RF input signals to two baseband signals, including an in-phase signal (component) I(t) and a quadrature signal (component) Q(t), that are converted to digital data by sampling. For example, if a RF input signal of 1 second is acquired and the sampling rate is 100 samples per second, the IQ-demodulator converts the RF input signal into 100 values of the I(t) component and 100 values of the Q(t) component. These values can be represented in form of a vector of complex numbers, for example [0.7+0.5j; 0.2+0.3j; . . . ]. In the example, values produced by the IQ-demodulator are comprised within (−1.0, 1.0). The first sample is described as "0.7+0.5j", which means that the I value is "0.7" and the Q value is "0.5". The vector of complex numbers can be converted into two vectors that respectively contains the I values and the Q values.

The other components of the radio receiver 301 are well known by the person skilled in the art and will not be described in further detail in the present disclosure.

The storage unit (memory) 305 stores one or more models for authentication of one or more RF devices. In an embodiment, the storage unit 305 stores a model M to be fitted (in other words: learned or trained) on RF signals originating from a first RF device. The storage unit 205 can also store one or more fitted (trained) models M1, M2, M3, . . . .

A model could be fitted on a plurality of first RF devices (different RF devices). In that case, the second RF device 30 is responsible for recognizing a group of first RF devices (the first RF devices on which the model is fitted), and not only one first device.

Alternatively, one model could be trained to recognize one particular first RF device 10. In that case, a plurality of different models are trained to recognize a plurality of first RF devices 10 (one model for each first RF device). Indeed, training several models (one for each first RF device) is better at rejecting cloned devices than fitting only one model.

The CPU 303 controls the operation of the second RF device 30. The RAM 304 is the working memory of the CPU 303.

The training (fitting) component 306 is a software component that runs on the CPU 303 to fit or train a model stored in the storage unit 305 on RF input signals originating from a corresponding first RF device (e.g., the first RF device 10).

Optionally, the second RF device 30 has a processing component 309 including a normalization part 307 and/or a filtering part 308 (with one or more filters).

The normalization part 307 is a software component that runs on the CPU 303. It is responsible for normalizing the feature data (in other words: the I data and Q data or, alternatively, only the I or Q data) acquired from the RF input signals received by the radio receiver 301. The normalization achieves to force all values to have a same scale. It can use a standardization technique. For example, a mean value is removed from each value and the result is divided by a standard deviation of the values to scale the values within the (−1.0; 1.0) range. For instance, if the received I values are between −0.1 and 0.6, the standardization converts to values in the range (−1.0; 1.0), with a mean of zero and a standard deviation of 1. When the feature data includes I data and Q data, the normalization can be applied separately for the I values and for the Q values. When taking the previous example, the I vector is [0.7; 0.2; . . . ] and the Q vector is [0.5; 0.3; . . . ]. Since the I and Q values may not be correlated, the respective distributions of the I values and Q values may not be the same. For example, the I values can be centered around 0.5 and the Q values around 0.7 for the 100 values obtained from the RF input signal of 1 second. Therefore, the I values and the Q values are processed as two independent (separate) vectors that must be normalized independently. The normalization mostly allows that the I values and Q values are insensible to the signal's strength acquired by the receiver (here the receiver device 20). For instance, the distance has an impact on the absolute range of the I and Q values: the greater the distance, the closer the received I and Q values are to 0. So, normalizing the I and Q vectors can render the model less sensitive to the strength of the received signal, by forcing all values to be in the same scale.

The one or more filters, or filtering part, 308 is responsible for filtering the feature data (in other words: the I data and Q data or, alternatively, only the I or Q data) before providing said feature data to the training component 306. In an embodiment, the filtering part 308 is a software component that runs on the CPU 303. Alternatively, it could be hardware (e.g., a band pass filter to isolate signals of interest and avoid interferences from other signals) or a mix of software and hardware. It is responsible for filtering the feature data acquired from the RF input signals received by the radio receiver 301 by processing or removing data. For example, some RF signals received by the second RF device 30 have an abnormal duration that is very short compared to the average duration of the RF signals. The data obtained from such very short RF signals could be removed. In other cases, the filtering part 308 includes one or more of the following elements for processing the data: a noise blanker, a noise reducer, a band pass filter and an interference detector.

The authentication component 310 is responsible for authenticating the first RF device 10 based on one or more RF signals originating from the first RF device 10, received by the radio receiver 301 and applied (in other words: provided as inputs) to the stored model M1, as will be described in more detail later.

In an embodiment, the system includes the third RF device 20, illustrated in FIG. 3, responsible for performing the fitting or training process (instead of the second RF device 30). The third RF device 20 includes an antenna 200, a radio receiver 201, a processor or CPU (Central Processing Unit) 203, a RAM 204, a storage unit 205 and a fitting or training component 206. Advantageously, the third RF device 20 introduces low jitter (bias) in the received RF signals. Indeed, the third RF device 20 is likely to introduce jitter or bias in the received RF signals since it is also dependent on analog components. This bias can be significantly reduced by using high quality components.

The radio receiver 201 can include an IQ-demodulator 202 (also called a quadrature demodulator) responsible for converting RF input signals to two baseband signals, including an in-phase signal (component) I(t) and a quadrature signal (component) Q(t), that are converted to digital data by sampling. The other components of the radio receiver 201 are well known by the person skilled in the art and will not be described in further detail in the present disclosure.

The storage unit 205 stores one or more models to be fitted (in other words: adapted or trained) on RF signals originating from one or more first RF devices, for example the first RF device 10. The storage unit 205 stores the model M to be fitted on RF signals from the first RF device 10.

The CPU 203 controls the operation of the third RF device 20. The RAM 204 is the working memory of the CPU 203.

The training (fitting) component 206 is a software component that runs on the CPU 203 to fit or train a model (e.g., M1) stored in the storage unit 205 on RF input signals originating from a corresponding RF transmitter device (e.g., the first RF device 10).

Optionally, the third RF device 20 has a processing component 209 for pre-processing the feature data (in other words: the I data and Q data or, alternatively, only the I or Q data) before providing said feature data to the training component 206. It can include a normalization part 207 and/or a filtering part 208 with one or more filters. The normalization part 207 is similar to the normalization part 307. The filtering part 208 is similar to the filtering part 308.

Figure 4:
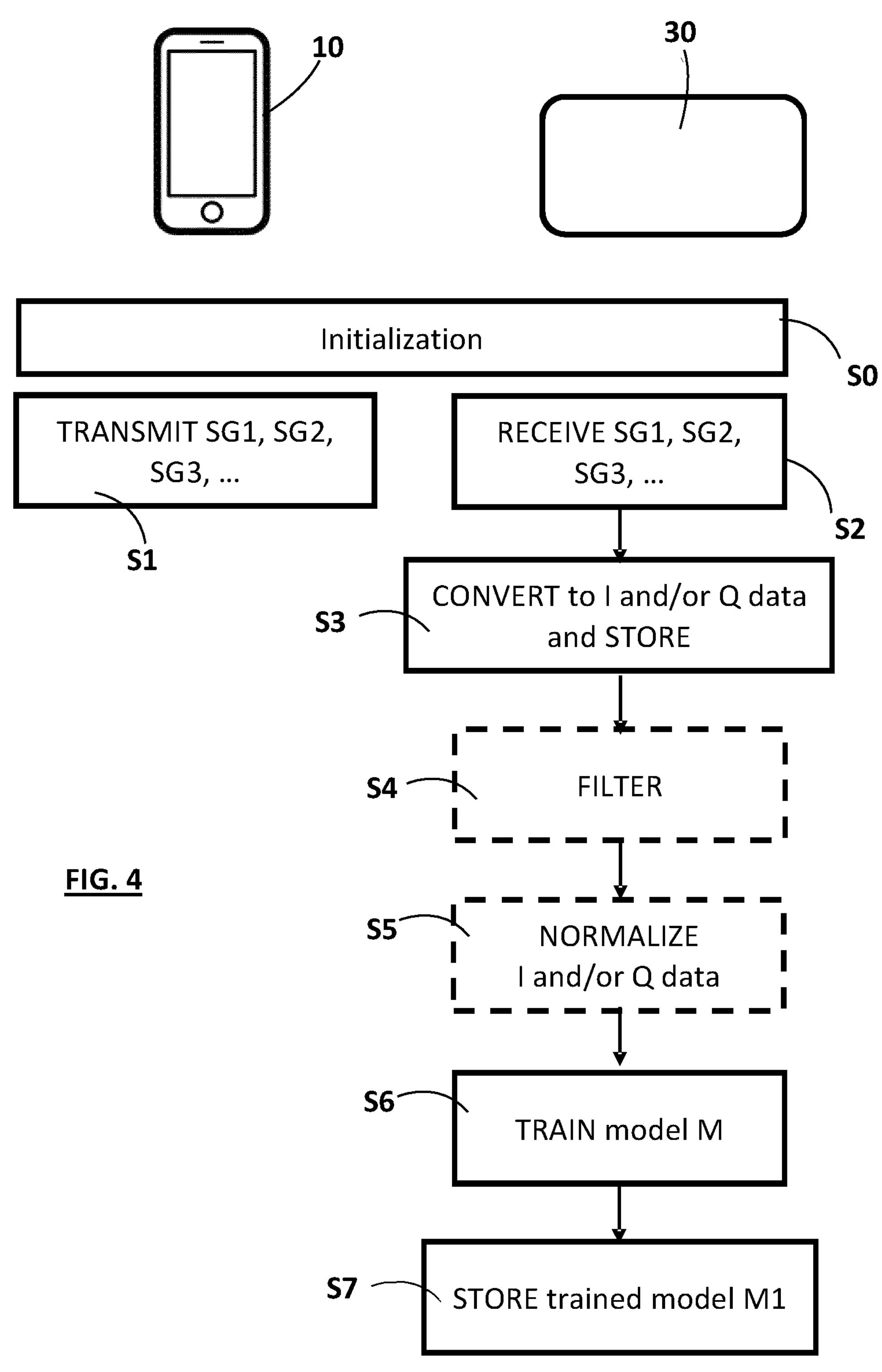
FIG. 4 is a flowchart of an initial (or training) phase of the computer-implemented method for authentication of a first RF device, according to an embodiment.

FIG. 4 illustrates an initial phase, or training process, of the computer-implemented method for authenticating the first RF device 10, described below. The initial phase allows to train the model M on RF signals sent from the first RF device 10. In the embodiment described below, the initial phase is executed by the second RF device 30.

In the described embodiment, the model M is a machine learning (ML) model. It is also an anomaly detection (AD) model.

The training phase can be implemented while the first RF device 10 and the second RF device 30 are in a secure state, which means that both devices 10, 30 can be trusted. Their security has not been compromised. Advantageously, the training phase is executed at any point in time until the system enters in the operational stage. For instance, the training phase is executed during the production of the first RF device 10, during the production of a product including the RF device 10, or at a distributor or reseller (for example during a first enrolment of the RF device 10 in the field).

In an initialization step S0, a communication between the first RF device 10 and the second RF device 30 is established. Each device 10, 30 carries an ID (identifier). In step S0, the identifiers of the devices 10 and 30 are shared over a logical protocol between the two devices 10, 30.

In a step S1, the RF device 10 transmits a plurality of RF signals (for example a plurality of messages) to the second RF device 30 via direct RF communication between the two devices 10, 30. The distance between the two devices 10, 30 should be appropriate.

In a step S2, the second RF device 30 receives the plurality of RF signals from the first RF device 10. The RF signals are received through the antenna 300 and the radio receiver 301.

In a step S3, the IQ-demodulator 302 converts each of the received RF signals from the RF device 10 into an in-phase signal I(t) and a quadrature signal Q(t) and converts them into data by sampling. The feature data (in other words: the I data and Q data or, alternatively, only the I or Q data) of the plurality of received RF signals are stored in memory.

In an optional step S4, the feature data is filtered by the filtering part 308, by removing and/or processing data.

In another optional step S5, the feature data is normalized by the normalization part 307.

The steps S4 and S5 allow to pre-process the feature data before the training step S6.

In the training step S6, the model M is trained on the feature data (in other words: the I data and Q data or, alternatively, only the I or Q data) derived from each of the plurality of RF signals received from the RF device 10, the feature data being optionally pre-processed in the step S4 and/or S5. For example, the model M is trained by the second RF device 30. In the present embodiment, the training is semi-supervised: it uses input training data that exclusively includes feature data obtained from RF signals transmitted from the first RF device 10. In other words, the RF signals used for the training are 'normal' RF signals only (in other words: RF signals from the genuine RF device 10). Thus, the model M is trained to represent the normal behavior. In the context of anomaly detection, the semi-supervised training is well adapted since the second RF device 30 uses RF signals coming from the genuine RF device 10 and the second RF device 30 predicts if a new incoming RF signal is coming from the genuine device 10 or from a cloned device.

In a variant, the training could be supervised. In that case, the training data is labeled. The feature data (in other words: the I data and Q data or, alternatively, only the I or Q data) is labeled as "normal" or "abnormal". This assumes that both 'normal' and 'abnormal' RF signals are acquired and pre-labeled by an operator.

In another variant, the training could be unsupervised. In that case, the feature data is unlabeled, the second RF device 30 does not know which RF signal is an anomaly, but supposes that, among all the received RF signals, there is a majority of normal RF signals.

After training (step S6), the trained model, referenced as M1, is stored in the memory 305 of the second RF device 30 in a step S7.

In another embodiment, the initial phase is performed by the third RF device 20. In that case, the steps S2 to S6 are executed by the second RF device 30. Then, the trained model M1 is provided (e.g., transmitted) by the third RF device 20 to the second RF device 30. The second RF device 30 receives and stores the trained model M1 in the memory 305.

After the training stage, the operational mode is implemented by the second RF device 30. In the operational mode, the second RF device 30 uses the stored model M1 to determine from a received RF signal whether or not the RF signal comes from the first RF device 10.

Figure 5:
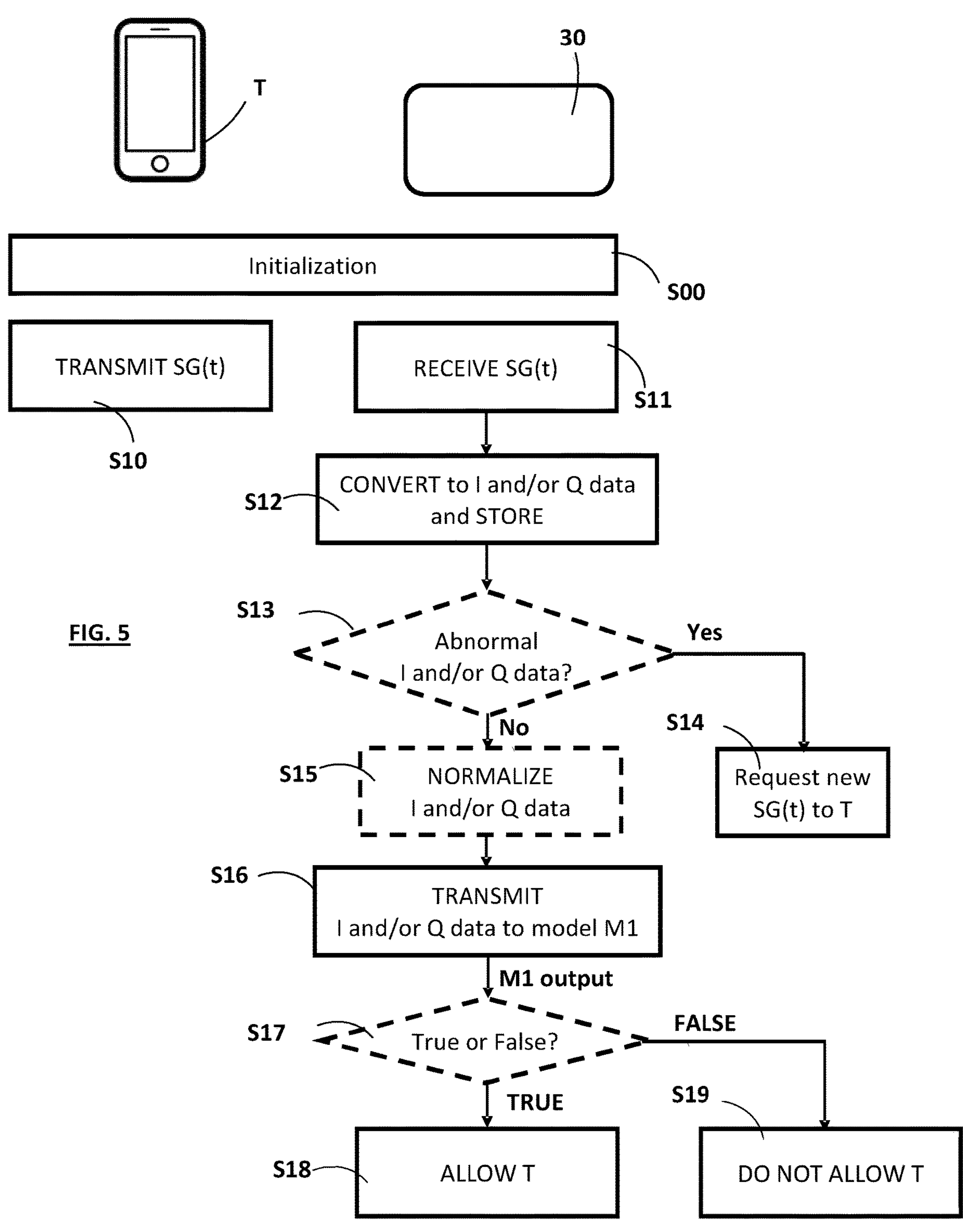
FIG. 5 is a flowchart of an operational mode (or inference stage) of the computer-implemented method for authentication of the first RF device, according to an embodiment.

FIG. 5 represents a flowchart of the operational stage of the computer-implemented method for authenticating the RF transmitter device 10, according to an embodiment. In an embodiment, at the operational stage, a RF signal from a RF device to authenticate T, received by the second RF device 30, is converted into feature data (in other words: the I data and Q data or, alternatively, only the I or Q data). Then, the feature data is provided (transmitted) as input (optionally after pre-processing) to the stored (and fitted) model M1 which provides as an output the information whether or not said RF device T is known (here, if it is the RF device 10) or unknown.

In an initialization step S00, a communication between the RF device to authenticate T and the second RF device 30 is established. Each of the two devices T and 30 carries an ID (identifier) that it shares over a logical protocol between the two devices T, 30. Thus, the second RF device 30 received the ID of the device to authenticate T.

In a step S10, the RF device T transmits a RF signal SG(t) to the second RF device 30 via the established RF communication.

In a step S11, the second RF device 30 receives the RF signal SG(t) from the RF device T, by means of the antenna 301 and the radio receiver 302.

In an embodiment, in a step S12, the IQ-demodulator 302 converts the RF signal SG(t) into I data and Q data. The IQ demodulator can convert the RF signal SG(t) to an in-phase signal I(t) and a quadrature signal Q(t) over time, and then converts the signals I(t) and Q(t) into I data and Q data by sampling. The feature data is directly derived from the received signal SG(t) and is used as a fingerprint of the RF device T. Alternatively, the RF signal SG(t) can be converted into I data only or Q data only.

In an optional step S13, the I data and Q data obtained from the received RF signal SG(t) are processed by the one or more filters 308. More precisely, the filtering part 308 can determine whether or not the feature data is abnormal, for example due to a very short duration of the signal SG(t). The abnormal feature data can be processed (to reduce or delete the anomaly) or ignored. In the second case, a new RF signal SG(t) from the RF device T can be requested by the second RF device 30 to the RF device T, in a step S14, for example upon request of the second RF device 30, and the steps S10 to S13 can be repeated.

The step S14 of requesting a new RF signal from the RF device T, when an abnormal RF signal is detected, could also be performed during the training process.

In an optional step S15, the I data and Q data obtained from the received RF signal SG(t) are normalized by the normalization part 207, as previously described (preferably in case that the feature data is not considered as abnormal).

In a step S16, the I data and Q data, optionally pre-processed in the step S13 and/or S15, are provided as input to the stored model M1. In the step S16, the model M1 is used at an inference stage. The model M1 stored in the second RF device 30 performs a prediction based on the I data and Q data received as inputs and produces an output that is either TRUE or FALSE. In an embodiment, the prediction relates to an anomaly detection, as the model is an anomaly detection model.

In a step S17, it is determined whether or not the RF device T is a known device (in other words: a RF device for which the trained model M1 is stored in memory 305). When the output is TRUE, it means that the RF device T is known (here that T is the first RF device 10). When the output is FALSE, it means that the RF device T is unknown (here that T is not the first RF device 10).

In a step S18, when the RF device T is known (TRUE), the second RF device 30 allows the RF device T to go further. For instance, the second RF device 30 grants access to an application to the RF device T. When the RF device T is unknown (for instance because it is a clone device), the second RF device 30 does not allow the RF device T to go further and can ignore any further RF signal from the RF device T, in a step S19.

In a variant, when the RF device T is unknown (and is potentially a clone device from an attacker), it is still allowed to go further but an alert is triggered to a connected backend. This is intended to make the attacker believe everything went well while a silent alert is triggered. Such a feature offsets the lack of perfect detection as the attacker cannot force the authentication by using multiple devices until one finally works.

In an embodiment, in the operational stage, the feature data (in other words: the I data and Q data or, alternatively, only the I or Q data) derived from a RF signal received from the first RF device 10 can be used to further train the corresponding stored model M1, under control of the training component 306 running on the CPU 303. It allows to update the stored model M1 with new feature data and thus helps adapt the model to various environmental conditions that were not included in the initial trained model M1.

In an embodiment, the model M is trained by the second RF device 30 (or by the third RF device 20) on the RF signals from a plurality of RF devices 10_1, 10_2, 10_3, . . . . Thus, a plurality of trained models M1, M2, M3, . . . can be created by the third RF device 20 (or by the second RF device 30) using RF signals from the plurality of first RF devices 10_1, 10_2, 10_3, . . . , respectively. The trained models M1, M2, M3 (each trained model Mi corresponding to one RF device 10_*i*) are then stored in the second RF device 30 and allow to recognize the corresponding RF device 10_1, 10_2, 10_3, . . . . Each trained model can be stored in association with the ID (identifier) of the corresponding RF device. When a communication between a RF device to authenticate T and the second RF device 30 is established, the second RF device 30 receives the ID of the RF device T and can select the corresponding model Mi based on the RF device ID. Then, the selected model is used to authenticate the RF device T. Alternatively, the second RF device 30 could try successively all the stored models M1, M2, M3, . . . with the incoming RF signals from the RF device to authenticate T and determine if one of them results in producing a TRUE output.

In an embodiment, the present authentication method is used by two RF devices to achieve a mutual authentication. In that case, each of the two RF devices performs the steps S2 to S7 and S11 to S19, previously defined, to authenticate the other RF device, using RF signals transmitted by said other RF device. Alternatively, the training steps S2 to S6 are not performed by the RF device itself but by a third device and the fitted (trained) model is then stored in the RF device.

Instead of using the I data and the Q data to train the model M and/or as input to the trained model at an inference stage, only the I data or only the Q data could be used. It allows to reduce the amount of data processed by the model.

In an embodiment, when two produced devices have respective analog biases that are similar to each other, they are "tagged" at production time. Then, the two devices are distributed to users so that they are less likely to collision in the field, for example in different places.

The present disclosure also concerns a computer program comprising instructions which, when the program is executed by a computer, cause the computer to perform the steps of the computer implemented method previously described.

The invention claimed is:

1. A computer-implemented method for authentication of a first device, the method comprising:

A) receiving a plurality of RF signals from the first device;

B) acquiring feature data from the received RF signals;

C) fitting a model for authenticating said first device using the acquired feature data;

D) storing in memory the fitted model in a second device;

E) by the second device, receiving a new RF signal from a device to authenticate;

F) by the second device, acquiring feature data from the new RF signal; and

G) by the second device, determining whether or not the device to authenticate is the first device by transmitting the feature data, acquired from the new RF signal, as input to the fitted model, wherein said authentication is based on only one component of said RF signal acquired over time selected from a group consisting of an in-phase component and a quadrature component so as to reduce amount of data to be processed while providing enhanced device authentication accuracy.

2. The method according to claim 1, wherein the model is a machine learning model, and fitting the model includes training the machine learning model using the feature data as input training data.

3. The method according to claim 2, wherein the machine learning model is trained in a semi-supervised manner by using input training data that exclusively includes feature data acquired from RF signals transmitted from the first device.

4. The method according to claim 1, wherein the model is an anomaly detection model.

5. The method according to claim 1, wherein, after storing of the fitted model in memory, the model is updated by the second device based on feature data acquired from a new RF signal received from the first device.

6. The method according to claim 1, further comprising normalizing the feature data before providing the normalized feature data to the model in at least one of C) and G).

7. The method according to claim 1, further comprising filtering the feature data before providing the filtered feature data to the model in at least one of C) and G).

8. The method according to claim 1, wherein A) to C) are performed by the second device or by a third device, different from the second device.

9. The method according to claim 1, wherein:

A) to C) are also performed for a plurality of RF signals transmitted by the second device to fit a model for authenticating said second device, and D) to G) are also performed by the first device for authentication of the second device using said fitted model, so that the first and second devices perform a mutual authentication.

10. The method according to claim 1, wherein A) to C) are performed for a plurality of first devices and a plurality of fitted models, corresponding to the plurality of first devices respectively, and the plurality of fitted models are stored in the memory in the second device.

11. The method according to claim 10, further comprising establishing a communication between the device to authenticate and the second device, wherein the device to authenticate transmits an identifier to the second device; and selecting, by the second device, the fitted model corresponding to the device to authenticate from among the plurality of fitted models stored in memory based on the identifier of said device to authenticate, the selected fitted model being used in G).

12. A system for authentication of a first device, the system comprising:

a second device; and a third device, wherein the third device is configured to:

receive a plurality of RF signals from the first device, acquire feature data from the received RF signals, and fit a model for authenticating said first device using the acquired feature data, wherein the second device is configured to:

store in memory the fitted model, receive a new RF signal from a device to authenticate, acquire feature data from the new RF signal, and determine whether or not the device to authenticate is the first device by transmitting the feature data, acquired from the new RF signal, as input to the fitted model, wherein said authentication is based on only one component of said RF signal acquired over time selected from a group consisting of an in-phase component and a quadrature component so as to reduce amount of data to be processed while providing enhanced device authentication accuracy.

13. A non-transitory computer-readable storage medium including computer executable instructions, wherein the instructions, when executed by a computer, cause the computer to perform the method according to claim 1.

14. A first device for authentication of a second device, the first device comprising circuitry configured to:

receive a plurality of RF signals from the second device, acquire feature data from the received RF signals, fit a model for authenticating said second device using the acquired feature data, store in memory the fitted model, receive a new RF signal from a device to authenticate, acquire feature data from the new RF signal, and determine whether or not the device to authenticate is the second device by transmitting the feature data, acquired from the new RF signal, as input to the fitted model, wherein said authentication is based on only one component of said RF signal acquired over time selected from a group consisting of an in-phase component and a quadrature component so as to reduce amount of data to be processed while providing enhanced device authentication accuracy.

15. The first device according to claim 14, wherein:

the model is a machine learning model, and the circuitry is configured to fit the model by training the machine learning model using the feature data as input training data.

16. The first device according to claim 15, wherein the machine learning model is trained in a semi-supervised manner by using input training data that exclusively includes feature data acquired from RF signals transmitted from the second device.

17. The first device according to claim 14, wherein the model is an anomaly detection model.

18. The first device according to claim 14, wherein, after storing of the fitted model in memory, the circuitry is configured to update the model based on feature data acquired from a new RF signal received from the second device.

19. The first device according to claim 14, wherein the circuitry is configured to normalize the feature data before providing the normalized feature data to the model.

20. The first device according to claim 14, wherein the circuitry is configured to filter the feature data before providing the filtered feature data to the model.

* * * * *